(12) United States Patent
Gaffiero et al.

(10) Patent No.: US 9,708,058 B2
(45) Date of Patent: Jul. 18, 2017

(54) DEVICE FOR FOLDING A BLADE, A BLADE, AND AN AIRCRAFT

(71) Applicant: AIRBUS HELICOPTERS, Marignane (FR)

(72) Inventors: Jacques Gaffiero, Paris (FR); Andre Amari, La Chapelle en Serval (FR)

(73) Assignee: AIRBUS HELICOPTERS, Marignane (FR)

( * ) Notice: Subject to any disclaimer, the term of this patent is extended or adjusted under 35 U.S.C. 154(b) by 567 days.

(21) Appl. No.: 14/463,981

(22) Filed: Aug. 20, 2014

(65) Prior Publication Data
US 2015/0251752 A1 Sep. 10, 2015

(30) Foreign Application Priority Data

Aug. 28, 2013 (FR) ...................................... 13 01992

(51) Int. Cl.
| | | |
|---|---|---|
| *B64C 27/50* | (2006.01) | |
| *B64C 27/48* | (2006.01) | |
| *F04D 29/34* | (2006.01) | |
| *F04D 29/36* | (2006.01) | |

(52) U.S. Cl.
CPC ............. *B64C 27/50* (2013.01); *B64C 27/48* (2013.01); *F04D 29/34* (2013.01); *F04D 29/36* (2013.01)

(58) Field of Classification Search
CPC ......... B64C 27/50; B64C 27/48; F04D 29/34; F04D 29/36
See application file for complete search history.

(56) References Cited

U.S. PATENT DOCUMENTS

| 2,966,947 A | * | 1/1961 | Batesole | ................. B64C 27/50 416/143 |
|---|---|---|---|---|
| 3,254,724 A | * | 6/1966 | Brooke | ................... B64C 27/50 416/103 |
| 3,484,175 A | * | 12/1969 | Vacca | ..................... B64C 27/50 244/7 R |
| 3,923,422 A | | 12/1975 | Ianniello et al. | |
| 4,738,592 A | | 4/1988 | Cavanaugh | |

(Continued)

FOREIGN PATENT DOCUMENTS

| EP | 2540620 | 1/2013 |
|---|---|---|
| FR | 2742726 | 6/1997 |

(Continued)

OTHER PUBLICATIONS

French Search Report for FR 1301992, Completed by the French Patent Office on May 15, 2014, 6 Pages.

*Primary Examiner* — Atif Chaudry
(74) *Attorney, Agent, or Firm* — Brooks Kushman P.C.

(57) ABSTRACT

A device (20) for folding a blade (5), the device comprising a fitting (30) and a cuff (50) connected to said fitting (30). The fitting (30) has at least one horizontal pin axis (31) perpendicular to a radial direction (AX2) and a clevis (35) axially offset relative to the horizontal pin axis (31) in the radial direction (AX2). The cuff (50) has an insert (51) inserted in said clevis (35), a vertical pin (70) passing through said clevis (35) and said insert (51). The cuff (50) includes at least one horizontal fastener pin axis (55) axially offset relative to said insert (51) along the radial direction (AX2), at least one lateral arm (80) connects said horizontal pin axis (31) to said fastener pin axis (55).

20 Claims, 3 Drawing Sheets

(56) References Cited

U.S. PATENT DOCUMENTS

| | | | |
|---|---|---|---|
| 5,782,606 A | 7/1998 | Mondet et al. | |
| 6,047,924 A | 4/2000 | Thomassin et al. | |
| 6,860,450 B2* | 3/2005 | Muylaert | B64C 27/50 244/17.11 |
| 8,070,452 B2 | 12/2011 | Parisy et al. | |
| 2004/0118970 A1* | 6/2004 | Muylaert | B64C 27/50 244/17.11 |
| 2013/0177422 A1 | 7/2013 | Bianchi et al. | |

FOREIGN PATENT DOCUMENTS

| | | |
|---|---|---|
| FR | 2754779 | 4/1998 |
| FR | 2918347 | 1/2009 |

\* cited by examiner

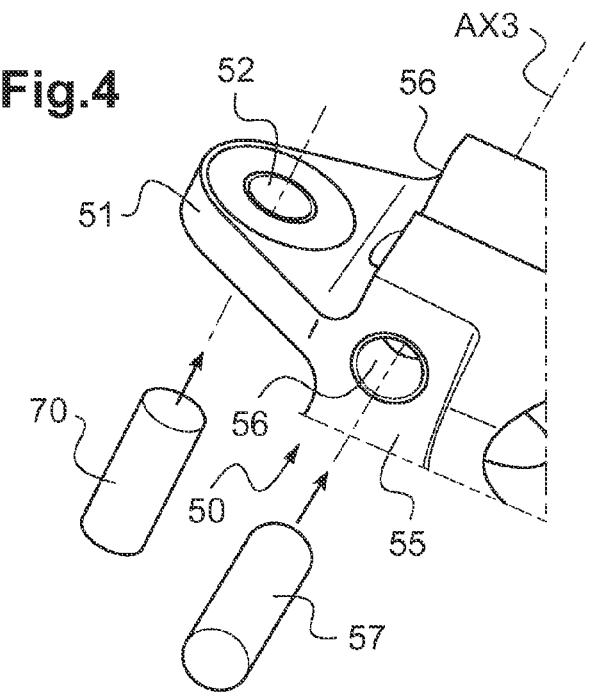
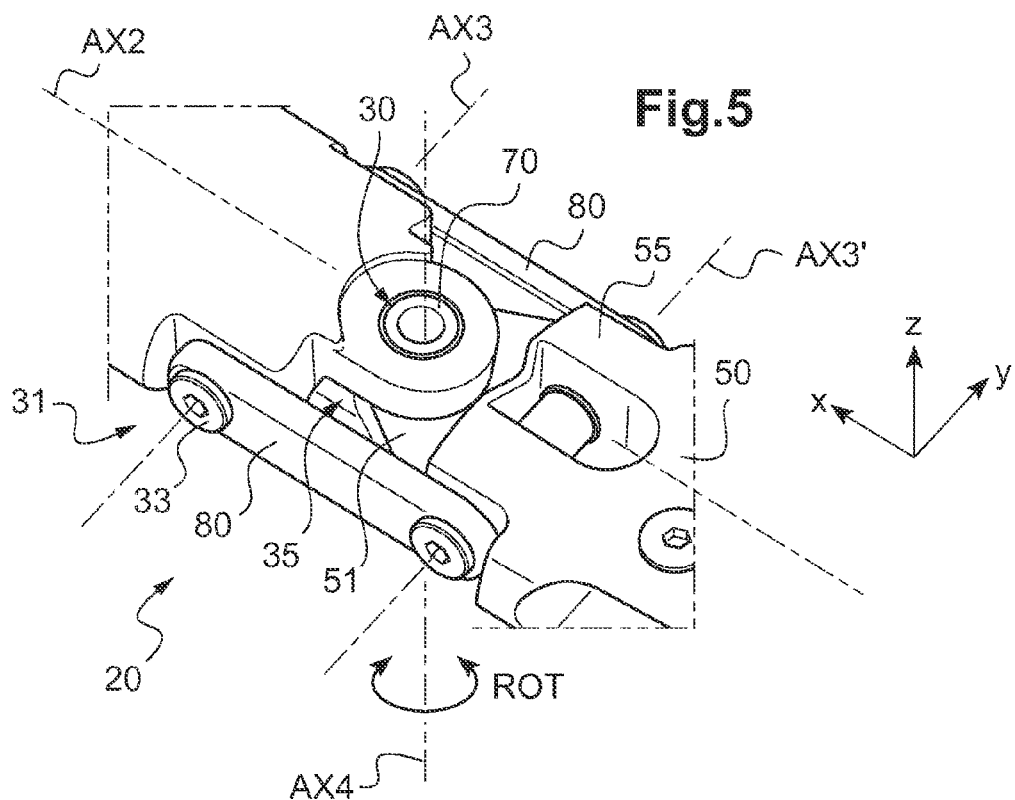

DEVICE FOR FOLDING A BLADE, A BLADE, AND AN AIRCRAFT

CROSS REFERENCE TO RELATED APPLICATION

This application claims priority to French patent application No. FR 13 01992 filed on Aug. 28, 2013, the disclosure of which is incorporated in its entirety by reference herein.

BACKGROUND OF THE INVENTION (1) Field of the Invention

The present invention relates to a device for folding a blade, to a blade fitted with the device, and to an aircraft.

(2) Description of Related Art

An aircraft may have a rotor provided with a plurality of blades. For example, a rotorcraft may have at least one lift rotor. Such a rotor can be relatively bulky when the aircraft is on the ground or on board a ship.

Consequently, a blade may include a folding device to enable it to be put into a position that minimizes the overall size of the aircraft. For example, the blades of a lift rotor of a rotorcraft may be folded so as to extend substantially parallel to an antero-posterior plane of symmetry of the aircraft.

A blade may comprise an airfoil and a cuff. The airfoil is fastened to the cuff, the cuff being fastened by hinge and retaining means to a hub of the rotor.

In an embodiment, the airfoil has two bushings arranged vertically. Each bushing thus presents a vertical direction of symmetry that extends in the thickness direction of the airfoil, being substantially perpendicular to the suction side and pressure side faces of the airfoil.

Each bushing thus passes through a spar of the airfoil along a vertical direction. For example, the spar may include tapes wound around each bushing. The tapes may be made of composite materials, for example.

Furthermore, the cuff has a clevis provided with two horizontal lugs arranged in elevation one above and the other below the airfoil. Each lug is then provided with one orifice per bushing in the airfoil in order to pass connection pins.

Consequently, the airfoil is fastened to the cuff by two connection pins, each connection pin passing through the clevis of the cuff and a bushing in the airfoil.

In order to fold the blade, an operator can then remove one of the connection pins so as to be able to pivot the airfoil relative to the cuff about the direction of rotation passing along the connection pin that remains in position.

That architecture is advantageous and effective. Nevertheless, it can be understood that the cuff presents thickness that is not negligible in order to enable the clevis to be arranged in elevation above and below the airfoil. The resulting assembly thus presents aerodynamic drag that can degrade the performance of the rotor fitted with the blade.

Arranging a clevis around an airfoil leads to a frontal area being obtained that is of considerable height in a plane perpendicular to a plane of rotation of a rotor. Consequently, this frontal area tends to generate a large amount of aerodynamic drag, giving rise to a loss of power from the rotor and to an increase in fuel consumption by the power plant driving the rotor in rotation in order to overcome a degradation in the performance of the rotor.

Document FR 2 742 726 describes a hinged cuff for connecting an airfoil to a hub. Thus, the cuff has a folding fitting pivotally mounted on a link member. The folding fitting is then fastened by two pins to the airfoil, the link member being fastened to a hub by hinge and retaining means.

Document FR 2 754 779 describes a method of folding by pivoting an airfoil about a pin connecting it to a cuff.

Document U.S. Pat. No. 3,923,422 describes an airfoil having a spar including tapes arranged flat. The tapes are nevertheless twisted at the root of the airfoil so as to be wound around two vertical bushings. Such twisting through about ninety degrees presents the drawback of possibly being destructive, insofar as a spar is constituted mainly by unidirectional fibers when blades are made of composite materials.

Document FR 2 918 347 describes an airfoil having a spar distributed over a leading edge, together with a suction side face and a pressure side face of the blade. A fastener fitting is attached to the root of the airfoil.

That fastener fitting possesses a horizontal shaft perpendicular to the span of the airfoil and to a direction of rotation of the rotor, tapes of the spar being wound in part around that horizontal shaft. In addition, the fastener fitting has vertical orifices passing vertically through the horizontal stud between two tapes of the spar.

Also known are Documents EP 2 540 620 and U.S. Pat. No. 4,738,592.

BRIEF SUMMARY OF THE INVENTION

An object of the present invention is thus to provide a device for folding a blade that generates optimized aerodynamic drag.

According to the invention, a device for folding a blade has a fitting suitable for being secured to a spar of an airfoil extending in a radial direction, the device having a cuff connected to the fitting and suitable for being fastened to a hub.

The folding device is remarkable in particular in that:

the fitting has at least one horizontal pin axis perpendicular to the radial direction of the fitting and of the airfoil, and at least one vertical pin orifice axially offset relative to the horizontal pin axis of the fitting along the radial direction;

the cuff has at least one horizontal pin axis and a vertical pin orifice;

the folding device has a vertical pin passing through the pin orifice of the fitting and the vertical pin orifice of the cuff; and said folding device includes at least one lateral arm connecting each horizontal pin axis of the fitting to a horizontal pin axis of the cuff in releasable manner so as to enable the fitting to pivot in rotation relative to the cuff about the vertical pin.

The term "horizontal" is used to designate a member that extends substantially parallel to the flapping direction of the fitting in flight and of the airfoil, and the term "vertical" is used to designate a member extending in flight substantially parallel to the lead-lag direction of the fitting and of the airfoil.

Consequently, the fitting that is to be secured to an airfoil presents at least one horizontal pin direction and at least one vertical pin direction. The vertical pin direction represents a pivot axis for the fitting relative to the cuff, while the horizontal pin axis of the fitting is attached to the cuff via at least one removable arm.

This novel architecture presents multiple advantages.

This combination thus contributes in particular to reducing the size in elevation of the frontal area of the blade in a section perpendicular to the plane of rotation of the rotor, and thus contributes to reducing the aerodynamic drag of the blade. As explained below, this combination is capable of not projecting vertically from the airfoil.

This combination also enables the blade to be folded. An operator can remove each of the lateral arms. Under such circumstances the fitting and thus the airfoil can pivot in rotation relative to the cuff about the vertical pin.

Furthermore, as explained below, the airfoil may include a spar extending around the horizontal pin axis of the fitting and the pin orifice in planes that are substantially horizontal and vertical.

Under such circumstances, the vertical pin performs three functions: it transmits the forces to which the airfoil is subjected from the clevis to the cuff; it attaches the fitting to the cuff; and it creates a pin direction.

Furthermore, the horizontal pin axis of the fitting enables tapes of the spar to be attached thereto and also enables the fitting to be attached to the cuff by the lateral arms. The horizontal pin axis of the fitting serves in particular to transmit to the cuff the forces that result from the lead-lag movement of the airfoil.

For this purpose, the lateral arms are individual structural parts that serve to transmit a portion of the forces between the airfoil and the cuff. The configuration of the lateral arms as connecting rods or links enables them to be attached to the horizontal pin axes of the fitting and of the cuff.

The fitting thus has both tapes wound around the horizontal pin axis and also tapes wound around the vertical pin orifice. These tapes may be made of composite materials, for example. This arrangement suffices for satisfying the objects of folding the airfoil and of taking up forces that result from lead-lag and flapping movements of the airfoil.

Finally, the cuff enables the airfoil to be connected to the hub by conventional hinge and retaining means. The height of the cuff is considerably reduced because of this architecture, thereby enabling its aerodynamic drag to be reduced, while still making it possible to perform the functions of folding the airfoil and also of removing it.

The folding device may include one or more of the following characteristics.

Thus, the fitting and the cuff together may define a clevis and an insert inserted in said clevis, the clevis and the insert each presenting said vertical pin orifices of the fitting and of the cuff.

Thus, depending on the embodiment, the fitting has either a clevis co-operating with an insert of the cuff, or else an insert co-operating with a clevis of the cuff. The insert can thus present dimensions that are small, thereby enabling the overall size of the device to be restricted.

In a first embodiment:

the fitting includes a clevis extending from the horizontal pin axis of the fitting in the radial direction, the clevis including the pin orifice of the fitting;

the cuff includes an insert offset axially from the horizontal pin axis of the cuff, said insert including said pin orifice of the cuff, said insert being arranged in said clevis by bringing the vertical pin orifice of the fitting into coincidence with the vertical pin orifice of the insert; and the vertical pin passes through the clevis of the fitting and the insert of the cuff.

The cuff is inserted by means of its insert within a clevis of the fitting of the airfoil. The folding device thus goes against existing prejudices, which consist on the contrary in providing the cuff with a clevis that extends both above and below the airfoil. By going against a common practice, the resulting folding device presents aerodynamic drag that is minimized relative to the prior art. It can be understood that the overall size of the device is reduced in an elevation direction, compared with that of the prior art.

Furthermore, the fitting may be T-shaped, the horizontal pin axis of the fitting extending transversely along a first branch of the T-shape and the clevis extending along a second branch of the T-shape orthogonal to the first branch.

In a second embodiment:

the cuff includes a clevis extending from the horizontal pin axis of the cuff in the radial direction, the clevis including the vertical pin orifice of the cuff;

the fitting includes an insert axially offset from the horizontal pin axis of the fitting, the insert including the pin orifice of the fitting, the insert being arranged in the clevis of the cuff by bringing the vertical pin orifice of the fitting into coincidence with the vertical pin orifice of the insert; and the vertical pin passes through the clevis and the insert.

The insert enables the root of the airfoil to be engaged so that the clevis of the cuff does not project in elevation relative to the airfoil.

Independently of the embodiment, the clevis may comprise a top lug and a bottom lug, each lug and the insert having the vertical pin passing therethrough.

The top and bottom lugs may extend in planes lying above and below the horizontal pin axes, where the term "above" and "below" should be considered relative to the gravity direction.

Furthermore, at least one horizontal pin axis may comprise both a bushing and also a pin passing through the bushing and at least one lateral arm in a horizontal pin direction.

In a version, the horizontal pin axis of the fitting is situated between the vertical pin and the horizontal pin axis of the cuff.

In another version, the horizontal pin axis of the fitting and the horizontal pin axis of the cuff are situated axially on opposite sides of the vertical pin.

Furthermore, the device may possess a single lateral arm including a damper. For example, the damper may seek to damp the lead-lag movements of the airfoil.

In addition, the fitting may have two horizontal pin axes that are offset from each other.

Likewise, the cuff may have two horizontal pin axes that are offset relative to each other.

These provisions may tend to cause one direction of pivoting to be preferred for folding an airfoil.

In addition to a folding device, the invention provides a blade that is provided with an airfoil extending spanwise in a radial direction.

The blade then includes a folding device of the above-described type, the fitting being secured to said airfoil.

The airfoil includes a spar, and the spar may present at least one horizontal tape wound in a horizontal plane and surrounding the vertical pin orifice of the fitting for transmitting forces that result from flapping movement of the airfoil, said spar representing at least one vertical tape wound in a vertical plane and surrounding a horizontal pin axis of the fitting in order to transmit forces that result from lead-lag movement of the airfoil.

The invention also provides an aircraft having a rotor comprising a hub and a plurality of blades. Each blade is then of the above-described type, each cuff being attached to the hub by hinge and retaining means.

BRIEF DESCRIPTION OF THE SEVERAL VIEWS OF THE DRAWINGS

The invention and its advantages appear in greater detail in the context of the following description of embodiments given by way of illustration and with reference to the accompanying figures, in which:

FIG. 4 is an end view of a cuff in a first embodiment of the invention;

FIG. 5 is a view of a folding device in a first embodiment of the invention.

Elements present in more than one of the figures are given the same references in each of them.

DETAILED DESCRIPTION OF THE INVENTION

It should be observed that three mutually orthogonal directions X, Y, and Z are shown in some of the figures.

The first direction X is said to be radial. The terms "radial" and "span" relate to any direction parallel to the first direction X.

The second direction Y is said to be transverse. The term "transverse" relates to any direction parallel to the second direction Y.

Finally, the third direction Z is said to be in elevation. The term "in elevation" relates to any direction parallel to the third direction Z.

The first and second directions X and Y form an XY plane that is said to be "horizontal", corresponding substantially to the plane of rotation in which the blades of a rotor move in rotation.

Planes orthogonal to this horizontal XY plane extend in elevation and are said to be "vertical".

The term "horizontal" refers to a direction parallel to the horizontal plane, while the term "vertical" refers to a direction perpendicular to the horizontal plane.

Figure 1:
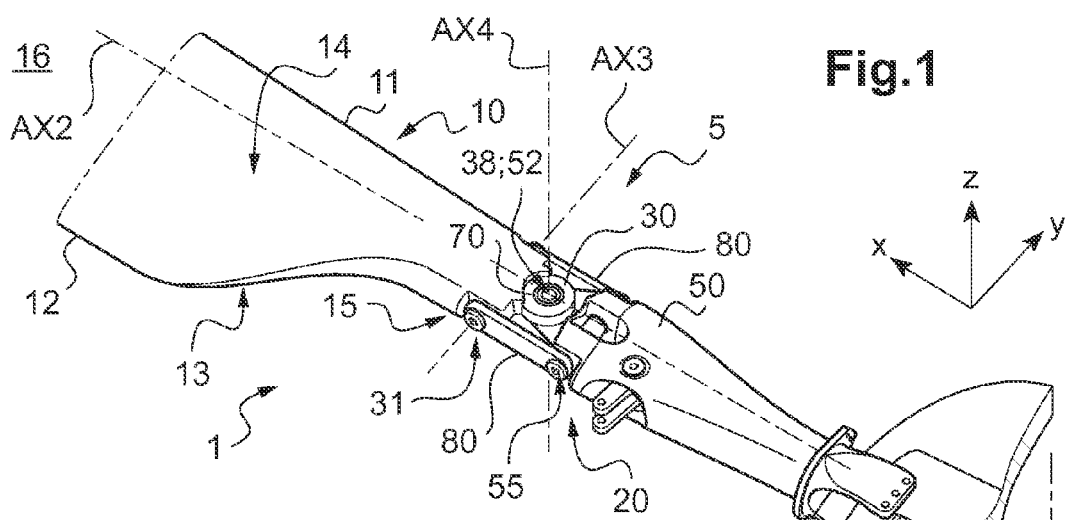
FIG. 1 is a view of an aircraft including a blade of the invention.

FIG. 1 shows an aircraft 1 having a rotor. The rotor comprises a hub 2 carrying a plurality of blades 5. In order to make FIG. 1 easier to read, only one blade 5 is shown in the figure.

Each blade 5 is provided with an airfoil 10. The airfoil extends transversely from a leading edge 11 towards a trailing edge 12, in elevation from a pressure side face 13 to a suction side face 14, and in span along the radial direction AX2 from a root 15 towards a free end 16.

The blade 5 also has a device 20 providing folding and attachment to the hub 2.

The device 20 has a fitting 30 co-operating with a cuff 50. The fitting 30 is secured to the airfoil 10, while the cuff is attached to the hub via conventional hinge and retaining means, not shown.

Thus, the fitting 30 possesses at least one horizontal pin axis 31 that is perpendicular to the radial direction. The horizontal pin axis thus extends along a pin direction AX3 that is orthogonal to a direction parallel to the direction of rotation AX1 of the rotor.

Furthermore, the fitting 30 is provided with at least one vertical pin orifice 38 that is offset axially relative to the horizontal pin axis 31 of the fitting along the radial direction AX2. The pin orifice 38 is suitable for receiving a pin extending along a vertical direction AX4 parallel to the direction of rotation AX1 of the rotor.

Under such circumstances, the cuff 50 also has at least one horizontal pin axis 55 and a vertical pin orifice 52.

Consequently, the folding device 20 includes a vertical pin 70 passing through the vertical pin orifice 38 of the fitting 30 and the vertical pin orifice 52 of the cuff 50 in order to hinge the fitting to the cuff while allowing a degree of freedom in pivoting about the vertical direction AX4.

In addition, the folding device 20 includes at least one lateral arm 80 reversibly connecting each horizontal pin axis 31 of the fitting 30 to a horizontal pin axis 55 of the cuff 50.

In order to limit the aerodynamic drag of the device 20, the fitting 30 and the cuff 50 together form a system comprising a clevis and an insert inserted in the clevis. The clevis and the insert define the vertical pin orifices through which the vertical pin 70 passes.

Figure 2:
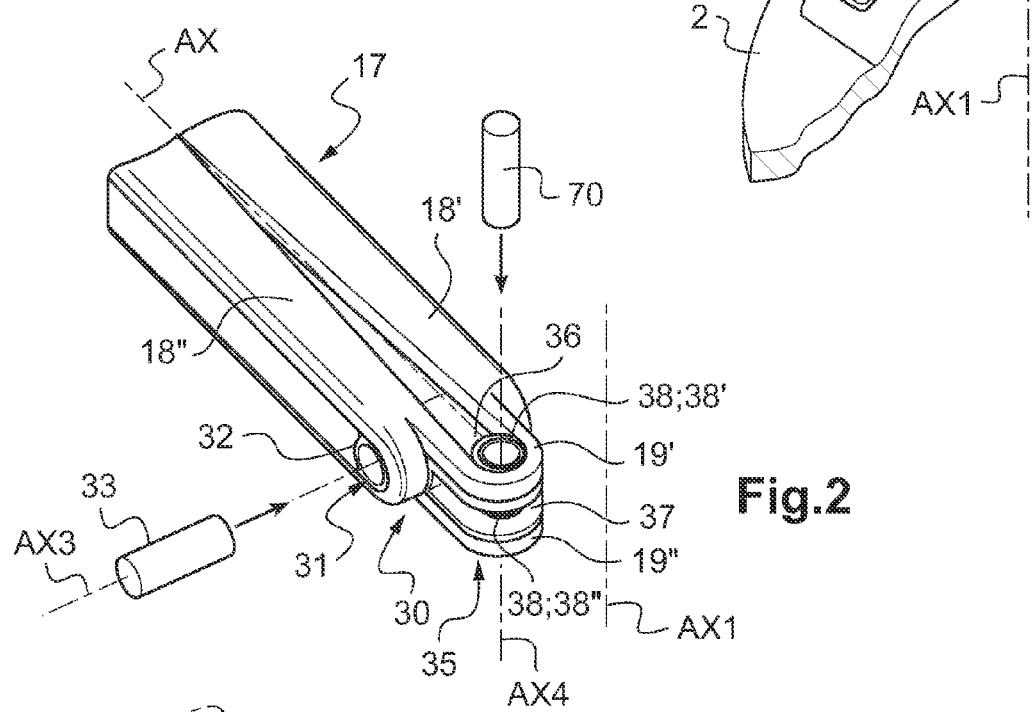
FIGS. 2 and 3 are views showing a fitting in a first embodiment of the invention.

FIG. 2 shows the fitting 30 according to a first embodiment.

This fitting 30 is T-shaped when seen from above the fitting has a first branch directed in a transverse direction of the corresponding airfoil and a second branch directed along a radial direction extending in the span direction of the airfoil, and thus along the radial direction AX2.

The fitting 30 is thus provided with a horizontal pin axis 31 extending in a transverse direction, and thus perpendicular to the radial direction AX2. The horizontal pin axis 31 may for example be provided with a horizontal housing 32 that is embodied by a bushing in FIG. 2, together with a pin 33 suitable for passing through the horizontal housing in a first horizontal pin direction AX3.

Furthermore, the fitting 30 possesses a clevis 35 extending from the horizontal pin axis towards the cuff in a radial direction, and thus along the radial direction AX2. The clevis and the pin axis are therefore axially offset from each other. By way of example, the clevis is interposed between the cuff 50 and the horizontal pin axis 31.

The clevis 35 has a top lug 36 and a bottom lug 37. Each lug is contained in a respective horizontal plane, which planes lie above and below the horizontal pin axis 31.

In addition, each of the top and bottom lugs 36 and 37 presents at least one vertical pin orifice 38', 38" directed along a vertical pin direction AX4 that is perpendicular to the top and bottom lugs. A vertical pin 70 can thus pass through the two lugs of the clevis 35.

The fitting 30 is secured to the airfoil. More precisely, the airfoil includes a spar 17. Consequently, the spar 17 is provided with a top tape 19' wound in a top horizontal plane around the top lug 36, and a bottom tape 19" wound in a bottom horizontal plane around the bottom lug 37. Furthermore, the spar 17 is provided with a right lateral tape 18' and with a left lateral tape 18" each of which is wound in a vertical plane around the horizontal pin axis 31 on either side of the top and bottom tapes 19' and 19". The forces that result from the flapping movement of the blade are transmitted by the spar 17 to the fitting via the clevis, and the forces resulting from the lead-lag movement of the blade are transmitted by the spar 17 to the fitting via the horizontal pin axis.

Figure 3:
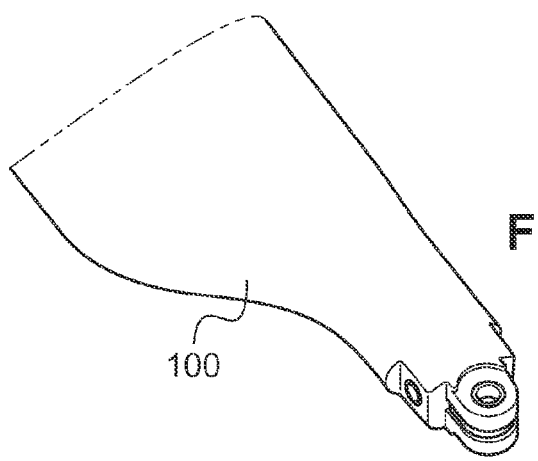
Figure 6:
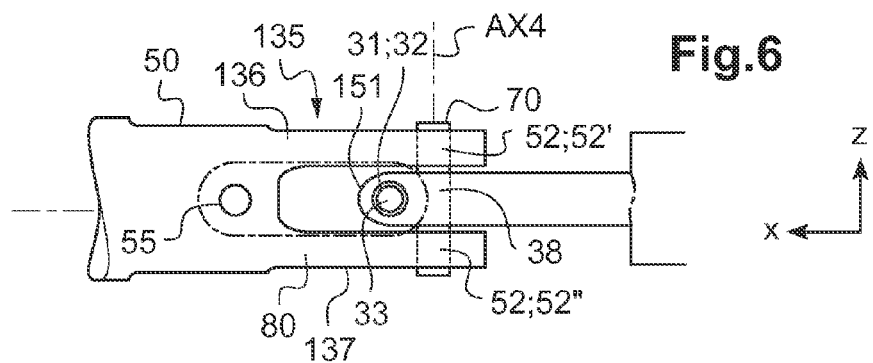
FIGS. 6 to 9 are views of an assembled folding device in a second embodiment of the invention.

FIG. 3 shows the airfoil covered in its skin 100. It should be observed that the fitting is an integral portion of the airfoil.

FIG. 4 shows the end of a cuff 50 that is suitable for connecting to the fitting 30.

The cuff 50 is provided with an insert 51 suitable for being inserted in the clevis 35 of the fitting between the top and bottom lugs of the clevis. This insert is provided with an orifice 52 extending in elevation in the vertical pin direction AX4. The orifice 52 in the insert can thus be brought into coincidence with the orifices in the lugs of the clevis 35 when the insert 51 is pushed into the clevis 35. The cuff can then be hinged about the vertical pin direction AX4 to the fitting 30 by a vertical pin 70 passing through the vertical pin orifices 38 in the clevis 35 and the vertical pin orifice 52 in the insert 51.

Furthermore, the cuff 50 includes at least one horizontal pin axis 55 offset axially from the insert 51 in the radial direction AX2, extending axially from the insert 51.

Each pin axis 55 may include at least one horizontal opening 56 secured to the insert 51, each opening extending transversely. In the embodiment of FIG. 4, the cuff may have two openings in line with each other. Each opening may be provided in a bushing.

Furthermore, the pin axis includes at least one pin 57 suitable for passing through at least one horizontal opening 56, and for passing through two facing openings, for example.

Figure 9:
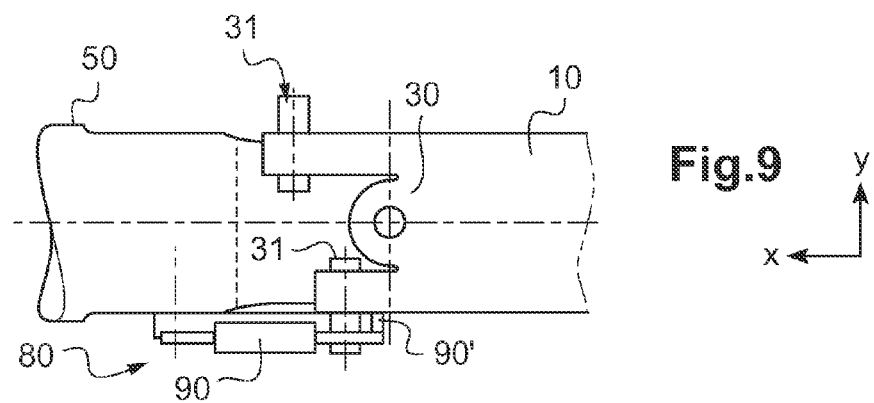

In the example of FIG. 9, the cuff may have two horizontal openings 56 that are offset relative to each other, each opening having its own pin passing therethrough. The cuff then has two horizontal pin axes that are offset from each other.

Likewise, the fitting may have at least two horizontal pin axes, optionally offset from each other.

With reference to FIG. 5, the device 20 is thus provided with at least one lateral arm 80 for connecting each horizontal pin axis 31 of the fitting to at least one horizontal pin axis 55 of the cuff.

Thus, when the insert 51 is positioned in the clevis 35, an operator installs the vertical pin 70. The vertical pin 70 then passes through the clevis 35 and the insert 51 so as to connect the fitting to the cuff via a hinge, the vertical pin occupying a vertical pin direction AX4 and an axis enabling the fitting to pivot relative to the cuff.

Furthermore, the operator installs the lateral arms. Thus, each lateral arm is fastened to the fitting by a horizontal stud. For example, a horizontal pin passes through each lateral arm and the fitting 30. In the example shown, a single pin passes along the horizontal pin direction AX3 of the fitting 30 and through both lateral arms.

In addition, each lateral arm is also fastened to the cuff. In the example shown, a single pin passes along a horizontal pin direction AX3' of the cuff 50 and through both lateral arms.

The overall size of the device 20 is thus relatively compact, the device not possessing any members projecting in elevation from the airfoil.

With reference to FIG. 9, the device has a single lateral arm 80. This lateral arm 80 includes a damper 90. The device may also have an abutment 90'.

Furthermore, and with reference to FIG. 1, the fastener stud may be situated outside the clevis 35 by being arranged between the insert 31 and the end of the cuff that is fastened to the hub.

Conversely, the fastener stud may pass through the clevis 35 of the fitting, between the top and bottom lugs.

FIGS. 6 to 9 show a second embodiment.

In this second embodiment, the clevis of the folding device 20 is arranged on the cuff, the fitting then being provided with an insert.

Consequently, the cuff 30 has a clevis 135 extending from a horizontal pin axis 55 of the cuff 50 in the radial direction AX2. The clevis 135 has a top lug 136 and a bottom lug 137 having vertical pin orifices 52', 52" formed therein.

Consequently, the fitting 30 has an insert 151 that is offset axially relative to the horizontal pin axis 31 of the fitting 30. The insert 151 then has at least one vertical pin orifice 38. The insert 151 is arranged between the top and bottom lugs 136 and 137 so as to bring the vertical pin orifice in the fitting into coincidence with the vertical pin orifices of the insert. Thereafter, a vertical pin 70 is passed through the clevis 135 and the insert 151 along the vertical pin direction AX4.

Figure 7:
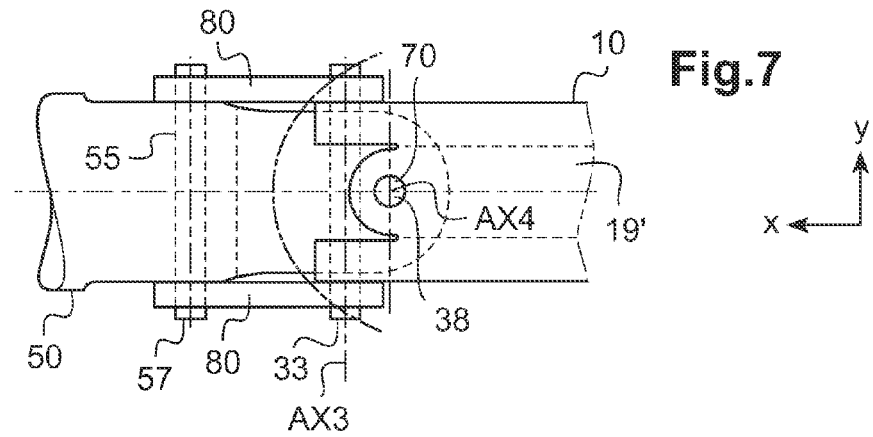

Furthermore, and with reference to FIG. 7, two lateral arms 80 connect each of the horizontal pin axes of the fitting with a horizontal pin axis of the cuff.

Figure 8:
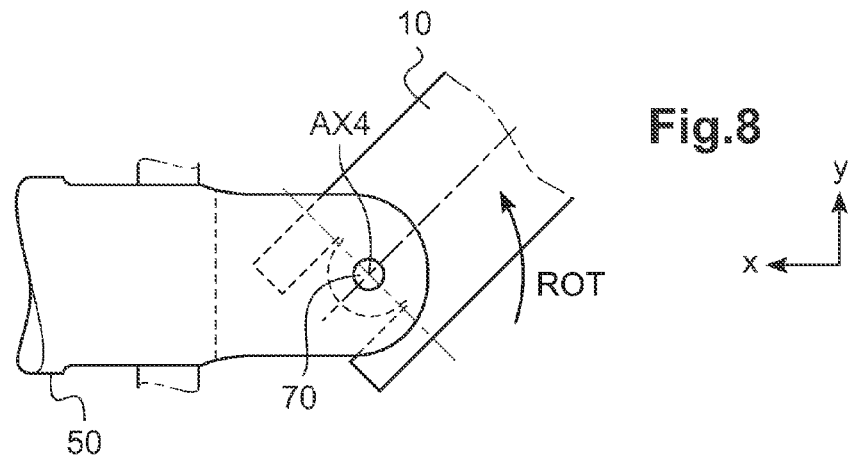

Independently of the embodiment, FIGS. 7 and 8 show how the blade is folded.

With reference to FIG. 7, the fitting and the cuff both extend in the radial direction of the fitting when the lateral arms are fastened to the fitting and to the cuff.

In order to fold the blade, an operator separates the lateral arms from the cuff and/or the fitting.

With reference to FIG. 8, the airfoil and the fitting can then pivot in rotation ROT about the vertical pin direction AX4.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A device for folding a blade that includes an airfoil extending in a radial direction and having a spar, the device comprising:
    a fitting suitable for being secured to the spar of the airfoil, the fitting having a horizontal pin axis perpendicular to a radial direction of the fitting, and a vertical pin orifice axially offset relative to the horizontal pin axis of the fitting along the radial direction of the fitting;
    a cuff connected to the fitting and suitable for being fastened to a hub, the cuff having a horizontal pin axis and a vertical pin orifice;
    a vertical pin passing through the vertical pin orifice of the fitting and the vertical pin orifice of the cuff; and
    a lateral arm connecting the horizontal pin axis of the fitting to the horizontal pin axis of the cuff in releasable manner so as to enable the fitting to pivot in rotation relative to the cuff about the vertical pin.

2. The device according to claim 1, wherein the fitting and the cuff together define a clevis and an insert inserted in the clevis, the clevis and the insert each presenting the vertical pin orifices of the fitting and of the cuff.

3. The device according to claim 2, wherein the clevis comprises a top lug and a bottom lug, each lug and the insert having the vertical pin passing therethrough.

4. The device according to claim 1, wherein the fitting includes a clevis that extends from the horizontal pin axis of the fitting in the radial direction of the fitting, the clevis including the vertical pin orifice of the fitting;
    the cuff includes an insert offset axially from the horizontal pin axis of the cuff, the insert including the vertical pin orifice of the cuff, the insert being arranged in the clevis by bringing the vertical pin orifice of the fitting into coincidence with the vertical pin orifice of the insert; and
    the vertical pin passes through the clevis and the insert.

5. The device according to claim 4, wherein the fitting is T-shaped, the horizontal pin axis of the fitting extending transversely along a first branch of the T-shape, while the clevis extends along a second branch of the T-shape orthogonal to the first branch.

6. The device according to claim 1, wherein the cuff includes a clevis extending from the horizontal pin axis of the cuff in the radial direction of the fitting, the clevis including the vertical pin orifice of the cuff;

the fitting includes an insert axially offset from the horizontal pin axis of the fitting, the insert including the vertical pin orifice of the fitting, the insert being arranged in the clevis of the cuff by bringing the vertical pin orifice of the fitting into coincidence with the vertical pin orifice of the insert; and the vertical pin passes through the clevis and the insert.

7. The device according to claim 1, wherein at least one horizontal pin axis includes at least one bushing and a pin that passes through the bushing and the lateral arm in a horizontal pin direction.

8. The device according to claim 1, wherein the horizontal pin axis of the fitting is situated between the vertical pin and the horizontal pin axis of the cuff.

9. The device according to claim 1, wherein the horizontal pin axis of the fitting and the horizontal pin axis of the cuff are situated axially on opposite sides of the vertical pin.

10. The device according to claim 1, wherein the lateral arm includes a damper.

11. The device according to claim 1, wherein the fitting has an additional horizontal pin axis, and the two horizontal pin axes of the fitting are offset from each other.

12. The device according to claim 1, wherein the cuff has an additional horizontal pin axis, and the two horizontal pin axes of the cuff are offset relative to each other.

13. The device according to claim 1 wherein the lateral arm is disposed laterally outside of the fitting and the cuff.

14. A blade assembly having an airfoil extending spanwise in a radial direction, wherein the blade assembly includes the device according to claim 1, and the fitting is secured to the airfoil.

15. The blade assembly according to claim 14, wherein the airfoil includes a spar, the spar including at least one horizontal tape wound in a horizontal plane and surrounding the vertical pin orifice of the fitting for transmitting forces that result from flapping movement of the airfoil, the spar including at least one vertical tape wound in a vertical plane and surrounding the horizontal pin axis of the fitting in order to transmit forces that result from lead-lag movement of the airfoil.

16. An aircraft provided with a rotor having a hub and a plurality of blade assemblies, wherein each blade assembly is a blade assembly according to claim 14, each cuff being attached to the hub by hinge and retaining means.

17. The blade assembly according to claim 14, wherein the airfoil includes a spar, the spar including at least one horizontal portion extending in a horizontal plane radially inwardly of the vertical pin orifice of the fitting for transmitting forces that result from flapping movement of the airfoil, the spar including at least one vertical portion extending in a vertical plane inwardly of the horizontal pin axis of the fitting in order to transmit forces that result from lead-lag movement of the airfoil.

18. An aircraft provided with a rotor having a hub and a plurality of blade assemblies, wherein each blade assembly is a blade assembly according to claim 14, each cuff being attached to the hub by a hinge.

19. A device for folding a blade that includes an airfoil extending in a radial direction and having a spar, the device for folding comprising:

a fitting suitable for being secured to the spar of the airfoil, the fitting having a horizontal pin axis and a vertical pin orifice offset relative to the horizontal pin axis of the fitting;

a cuff to be connected to the fitting and suitable for being fastened to a hub, the cuff having a horizontal pin axis and a vertical pin orifice;

a vertical pin that is insertable into the vertical pin orifice of the fitting and the vertical pin orifice of the cuff; and a lateral arm for connecting the horizontal pin axis of the fitting to the horizontal pin axis of the cuff in a releasable manner so as to enable the fitting to pivot relative to the cuff about the vertical pin;

wherein the horizontal pin axis of the fitting and the horizontal pin axis of the cuff are situated on opposite sides of the vertical pin when the vertical pin is disposed in the vertical pin orifice of the fitting and the vertical pin orifice of the cuff.

20. A device for folding a blade that includes an airfoil extending in a radial direction and having a spar, the device for folding comprising:

a fitting suitable for being secured to the spar of the airfoil, the fitting having two horizontal pin axes that are offset from each other, and a vertical pin orifice offset relative to the horizontal pin axes of the fitting;

a cuff to be connected to the fitting and suitable for being fastened to a hub, the cuff having a horizontal pin axis and a vertical pin orifice;

a vertical pin to pass through the vertical pin orifice of the fitting and the vertical pin orifice of the cuff; and a lateral arm for connecting one of the horizontal pin axes of the fitting to the horizontal pin axis of the cuff in a releasable manner so as to enable the fitting to pivot relative to the cuff about the vertical pin.

* * * * *